March 11, 1952    L. R. PAGE, JR., ET AL    2,589,022
APPARATUS AND METHOD FOR MAKING
PLASTIC FOLDING CONTAINERS
Filed June 21, 1948
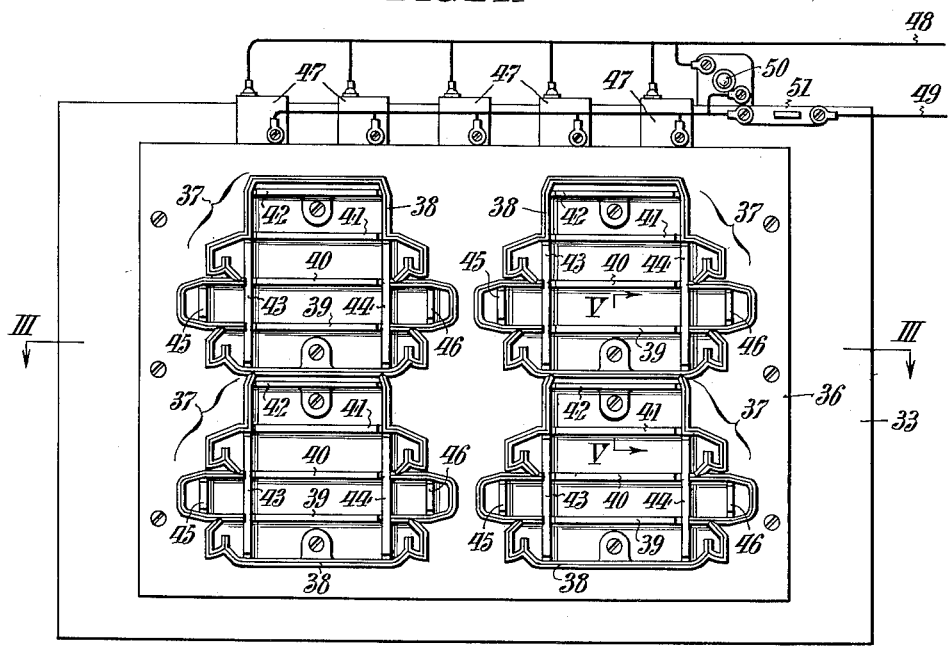
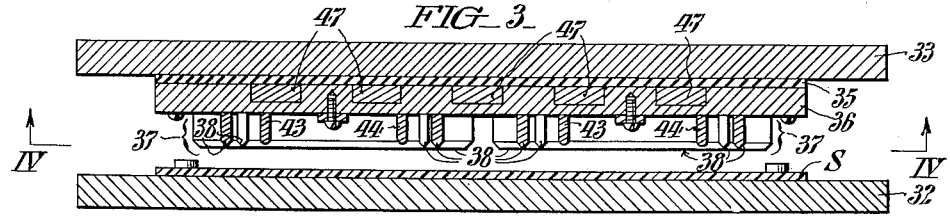
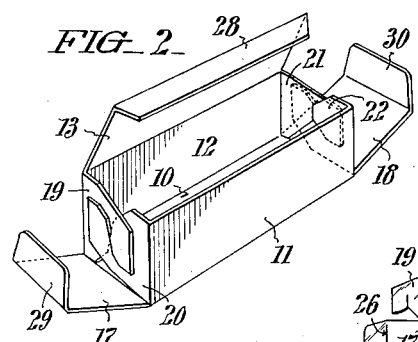
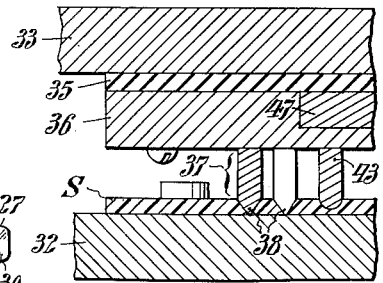
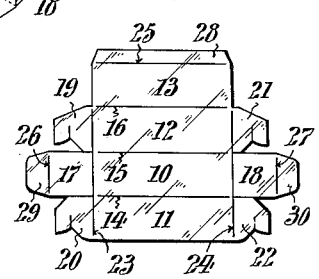
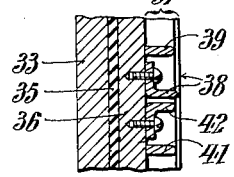
INVENTORS:
Louis Rodman Page, Jr. &
John Pusey Croasdale, Jr.,
BY Paul r Paul
ATTORNEYS.

Patented Mar. 11, 1952

2,589,022

UNITED STATES PATENT OFFICE 2,589,022

APPARATUS AND METHOD FOR MAKING PLASTIC FOLDING CONTAINERS

Louis Rodman Page, Jr., Radnor, and John Pusey Croasdale, Jr., Daylesford, Pa., assignors, by mesne assignments, to Robert Gair Company, Inc., New York, N. Y., a corporation of Delaware Application June 21, 1948, Serial No. 34,298

5 Claims. (Cl. 18—19)

This invention relates to folding containers and folding container blanks formed of synthetic plastic material and to a mass production process for the manufacture thereof, as well as to means for carrying out the process.

While various synthetic plastic materials in sheet form have been generally available for several years, the use of plastic sheets in the making of containers, and particularly in the mass production of container blanks for folding boxes, has been very limited. Previous attempts to use rigid plastic sheets in the manufacture of blanks for folding containers have failed except for particular uses of such rigid material as one component of a combined or laminated sheet. The present invention is specifically directed toward providing a folding container and container blank made from single ply synthetic plastic sheet material having sufficient rigidity in itself to maintain the desired final container form. A further object is to provide a container blank of such material characterized by being easily foldable to the final container form without fracturing at the scoring lines. A still further object of the present invention is to provide an efficient process for the mass production of container blanks having the above characteristics, and means suitable to the economic practice of the process.

We have found that the principal difficulty involved in the use of single ply synthetic plastic sheet material in the mass production of container blanks intended for ultimate assembly into folding containers is in providing folding lines which will not crack or fracture when the blanks are set up to form the final containers. This difficulty is avoided in accordance with the present invention by the use of heat along the folding lines of suitably profiled blanks cut from single ply plastic sheet material containing vinylidene chloride as one of the principal components. As a specific example, we have determined that plastic sheeting consisting of a copolymer of vinyl acetate and vinyl chloride having vinylidene chloride as an additional ingredient constitutes a satisfactory base material if heated scoring elements are applied along the lines on which the container blanks are intended to be folded.

In the manufacture of the preferred plastic material used in the practice of the present invention, a suitable plasticizer may be employed in the compounding of the copolymer of vinyl acetate and vinyl chloride, and a suitable solvent included along with the vinylidene chloride, which solvent is driven off during the calendaring process which is used in obtaining plastic sheets of the desired smoothness, clarity and thickness. The exact proportion of vinylidene chloride in the finished product is not critical with respect to the desired folding action which we have discovered, it being required only that a sufficient amount of vinylidene chloride be included to alter the heat response characteristics normally encountered in plastic sheet materials of the vinyl chloride-vinyl acetate type. In is this altered plastic material that exhibits the desired reaction to heat and pressure along the folding lines making it possible to mass produce blanks which may be assembled easily to container form. These results are not obtained if the vinyl chloride-vinyl acetate copolymer is not subjected to the change in its characteristics brought about by the incorporation of vinylidene chloride. The exact chemical constitution of the above described plastic material is not known but probably includes a mixture of polyvinylidene chloride and the copolymer of vinyl chloride and vinyl acetate and perhaps some copolymers of vinylidene chloride.

In forming the container blanks of the present invention, we employ apparatus, such as hereinafter disclosed, in which a heated profile cutting edge and heated scoring edges are arranged in a way on a die element to give the desired container blank shape with the folding lines formed by a heating action which produces a change in the characteristics of the plastic sheet along the folding lines. In the practice of the present invention we have determined that the cutting and scoring edges operate best at temperatures in the range from 180° F. to 250° F., the optimum temperature being about 220° F. We have found that temperatures of this order are obtainable by electrically heating the bed plate of a platen press by which the cutting and scoring elements are carried. The pressures applied correspond to those normally encountered in the operation of the well-known platen presses of the container blank art.

In the final assembly of the flat container blanks to the finished container forms, the blanks are subjected to the usual breaking and folding action along the scored lines and are held to shape by the use of a suitable adhesive or solvent applied to the customary overlapping flaps of the blanks. It will thus be seen that the basic operations of the present invention are adapted to mass production methods and this is of great advantage in carrying out the process and in using the product commercially.

In the drawings, Fig. 1 shows a typical scored container blank formed, in accordance with our invention, from a single ply plastic sheet material.

Fig. 2 shows how the blank is folded along its score lines in setting up the container.

Fig. 3 shows in cross section as indicated by the arrows III—III in Fig. 4 an improved apparatus for producing container blanks from plastic sheet in accordance with our invention.

Fig. 4 is a view in bottom plan looking as indicated by the angled arrows IV—IV in Fig. 3.

Fig. 5 is a fragmentary view in section taken as indicated by the angled arrows V—V in Fig. 4; and Fig. 6 is a fragmentary view in section, on a larger scale and corresponding to Fig. 3 showing how a blank is cut from the plastic sheet and at the same time scored.

As exemplified in Fig. 1, the blank is suitably profiled to provide the container bottom 10, sides 11 and 12 and lid 13 which are defined by the parallel crosswise score lines 14, 15, 16, main end wall outer flaps 17, 18 and end wall inner flaps 19, 20 and 21, 22 which are bendable along score lines 23 and 24 at right angles to said crosswise lines. The lid 13 and the inner end wall tabs 17 and 18 are moreover scored as at 25, 26 and 27 for the provision of adhesive flap 28 and terminal flaps 29 and 30. The box is set up from the blank in a more or less well known manner as will be obvious from Fig. 2.

The apparatus which we have devised to produce the blanks includes a lower plate 32 which may be the movable member or platen of a press, and an opposing upper or head plate 33. Secured to the bottom face of the head plate 33, with interposition of insulation 35, is a metallic foundation plate 36 whereto are in turn secured a plurality of hollow cutting and scoring dies 37 for concurrently producing a like number of container blanks at each actuation of the press. As shown, each die 37 has a sharp beveled perimetric cutting edge 38 corresponding to the profile configuration to which the blanks are to be cut, as well as blunt or round ended crosswise scoring edges 39—42 and similar scoring edges 43 and 44 extending at right angles between the ends of the crosswise scoring edges. These edges 39—42 and 43, 44 determine the score lines 14—16 and 25 and 23, 24 of the blank in Fig. 1, while similar blunt edge elements 45 and 46 determine the score lines 26 and 27. It is to be particularly noted that the knife edge extends somewhat below the blunt crease edges 39—46. Embedded in the foundation plate 36 is a plurality of electric heating devices 47 which are connected in parallel to current conductors 48 and 49. A signal light 50 is connected across the conductors 48 and 49 to indicate current flow, and a thermostatic control 51 is provided to hold the plate 36 at the desired temperature.

In operation, a plastic sheet indicated at S is placed upon the platen 32 as shown in Fig. 3, whereupon the press is closed as in Fig. 6. As the press is momentarily closed, the knife edge 38 completely penetrates and severs the sheet by contact with the top face of the platen 32, but the blunt scoring edges penetrate only part way as also clearly shown in Fig. 6. Heating of the edges to a temperature within the limits hereinbefore specified, results in clean severance of the plastic sheet at the cutting lines and in a change in the character of the plastic at the score lines which will permit of ready bending and folding without tendency to fracture or crazing incident to setting up of the containers as has already been explained.

The change which takes place in the plastic material in the region of the folding lines may be observed as a very slight whitening effect which is the result of the heating and stretching action brought about by the application of the heated edges of the die. As shown in Fig. 6, the heated scoring blades 43 deform the plastic sheet S, and penetrate into it along the score lines, on one side only of the sheet. The chemical nature of this change is not completely understood but the plastic material thus changed has folding properties which are entirely different from the folding properties of the same plastic material prior to the stretching action induced by the application of heat and pressure. Moreover, these changes in folding characteristics are permanent and thus remain after the altered plastic has cooled. This feature is of importance in the folding container art since considerable time normally elapses from the time the container blanks are formed until their ultimate assembly as a container. The whitening effect referred to above is not objectionable if confined narrowly to the region of the folding lines. However, a general whitening extending to the side walls of the container is undesirable and should be avoided. Where a plastic sheet containing vinylidene chloride is thus subjected to the action of a heated edge, the subsequent folding operation is easily carried out and the whitening effect does not extend to the side walls, whereas folding lines formed with cold scoring blades under normal pressures do not provide a satisfactory fold and show a marked tendency on folding to produce a whitening which extends to the side walls of the container.

From the above description it will be seen that we have provided a container blank and container which is capable of being produced by the use of a novel mass production method which we have also described. To the best of our knowledge and belief this represents the first plastic folding container to be mass produced from a single ply sheet of plastic material.

We claim:

1. A press for cutting and scoring plastic container blanks comprising a die having cutting and scoring blades attached thereto, a flat surfaced opposing press plate, said scoring blades constituting means on said die coacting with said press plate for maintaining a plastic sheet flat during a cutting and scoring operation, a heat conductive backing in contact with said die, an electrical heating element embedded in said backing, said cutting blades being attached to said backing in heat conducting relationship, said blunt scoring blades being attached to said backing in heat conducting relationship and shorter than said cutting blades whereby they are constructed and arranged to heat and deform a flat plastic sheet along the lines of said scoring blanks simultaneously with the cutting action of said cutting blades.

2. In a method of forming container blanks from sheet material comprising vinyl chloride, vinyl acetate and vinylidene chloride by the application of cutting blades and non-cutting scoring elements, the steps which comprise heating said cutting blades and non-cutting scoring elements, contacting said sheet substantially simultaneously with said heated cutting blades and scoring elements while maintaining said sheet flat, maintaining such contact under pressure sufficient to cut completely through said sheet material along the lines of said cutting blades and to heat and deform said sheet along the lines of said scoring elements while maintaining said sheet flat, withdrawing said cutting blades and scoring elements from said sheet, and cooling said sheet while flat.

3. A method of forming single-ply container blanks from a sheet material comprising vinyl chloride, vinyl acetate and vinylidene chloride comprising the steps of heating cutting blades and non-cutting scoring blades to a temperature of 180° F. to 250° F., contacting said sheet with said cutting blades while contacting one surface of said sheet with said scoring blades and maintaining the opposite surface of said sheet flat, maintaining said contact under pressure sufficient to cut completely through said material along the lines of said cutting blades and maintaining contact between said heated scoring blades and said flat sheet under pressure sufficient to deform the material along the lines of the scoring blades, whereby the sheet material is rendered foldable along the scoring lines after cooling without cracking, breaking, or discoloration.

4. In a method of forming a blank from sheet material in the form of a vinyl chloride-vinyl acetate plastic containing vinylidene chloride, the steps which comprise heating cutting blades and non-cutting scoring blades to a temperature of about 180° F. to 250° F., contacting one face of said sheet with a rigid material having a flat surface, contacting the other face of said sheet with said cutting and scoring blades while maintaining the first mentioned face of the sheet against the flat surface of said rigid material, maintaining said contact under pressure sufficient to cut completely through said sheet material along the lines of said cutting blades and to heat and deform the sheet material along the lines of the scoring blades, said deformation being restricted to said first mentioned face, withdrawing the cutting and scoring blades from said sheet, and cooling said sheet while flat.

5. A method of forming a plastic container comprising the method defined in claim 4, further characterized by the fact that the cooled sheet is folded along the score lines while cool to form the finished container.

LOUIS RODMAN PAGE, Jr.
JOHN PUSEY CROASDALE, Jr.

REFERENCES CITED

The following references are of record in the file of this patent:

UNITED STATES PATENTS

| Number | Name | Date |
|---|---|---|
| 1,856,319 | Cooper | May 3, 1932 |
| 1,913,055 | Keller | June 6, 1933 |
| 2,105,270 | Scheffey | Jan. 11, 1938 |
| 2,157,794 | MacDonald | May 9, 1939 |
| 2,170,060 | Meyer | Aug. 22, 1939 |

FOREIGN PATENTS

| Number | Country | Date |
|---|---|---|
| 843,288 | France | June 28, 1939 |